United States Patent Office 3,594,395
Patented July 20, 1971

3,594,395
THALLIC TRIFLUOROACETATE AND PROCESS
Edward C. Taylor, Princeton, N.J., and Alexander McKillop, Norwich, England, assignors to Smith Kline & French Laboratories, Philadelphia, Pa.
No Drawing. Filed Jan. 21, 1969, Ser. No. 792,765
Int. Cl. C07f 5/00
U.S. Cl. 260—429                                                                                     1 Claim

ABSTRACT OF THE DISCLOSURE

Thallic trifluoroacetate is prepared by reacting thallic oxide with trifluoroacetic acid. The compound reacts with aromatic compounds to give intermediates convertible to useful substituted aromatic compounds.

---

This invention relates to the chemical compound thallic trifluoroacetate and to processes which utilize said compound.

Thallic trifluoroacetate (I) is prepared by the reaction of thallic oxide with trifluoroacetic acid.

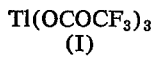

The thallic oxide is dissolved in refluxing trifluoroacetic acid, and the product obtained by evaporation of the solid under reduced pressure. The product is colorless and hygroscopic, and can be stored in a stopped flask at room temperature over $P_2O_5$.

It is useful in the prapartion of a wide variety of substituted aromatic compounds.

Thallic trifluoroacetic is a highly effective agent for the direct thallation of aromatic compounds which are subsequently convertible to known and useful aromatic compounds. Reaction of an aromatic substrate with thallic trifluoroacetate gives an intermediate aryl thallium di-trifluoroacetate (II). The trifluoroacetate groups are

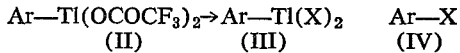

readily displaced to give substituted aryl thallium compounds (III) which undergo decomposition with loss of a thallium compound to give substituted aromatic compounds (IV). Displacement can occur with various anions, including iodide, chloride, and cyanide. Reaction with iodide is most useful, as the resulting aryl thallium diiodides decompose spontaneously decompose to give the corresponding aromatic iodide in high yield.

The aromatic thallium compounds (III) which are prepared using thallic trifluoroacetate are intermediates for the preparation of a wide range of organic compounds. Currently available synthetic routes to these compounds, however, consist of laborious, multistage syntheses. The compound of the present invention therefore represents an important addition to the armamentarium of the synthetic organic chemist for use in preparing other desired compounds.

Thallic trifluoroacetate may be used as a solid or in various solvents, including trifluoroacetic acid. It is prepared by refluxing thallic oxide in trifluoroacetic acid for about 1 to about 100 hours. The time of reflux is not critical, but periods of 5–50 hours are preferred. A solution of thallic trifluoroacetate in trifluoroacetic acid is in fact a powerful thallation agent. Reaction of thallic trifluoroacetate with substrates which are activated toward electrrophilic substitution is generally complete within a few minutes at room temperature. Thallation of mildly deactivated substrates such as the halobenzenes requires thirty minutes at reflux temperature (70° C.); deactivated substrates such as benzoic acid and α,α,α-trifluorotoluene are thallated after 21 and 98 hours, respectively. Generally the aryl thallium di-trifluoroacetate intermediate crystallizes from the reaction mixture.

The intermediate is then treated with an appropriate source of a nucleophile such as potassium iodide or iodine to give the iodo or other substituted aromatic compound.

For acid-sensitive aromatic substrates such as thiophene, it is advantageous to use solid thallic trifluoroacetate in the thallation step to avoid extensive decomposition of the starting material. Conversion of the thallium derivative into the desired product is carried out as described above.

A wide variety of aromatic substrates may be substituted using thallic trifluoroacetate. These include benzene; substituted benzenes such as fluorobenzene, chlorobenzene, toluene, ethylbenzene, m-xylene, anisole, mesitylene, benzoic acid, and α,α,α-trifluorotoluene; heterocyclic aromatics such as thiophene and 2-bromothiophene; and polycyclics such as naphthalene. Substituents which can be so introduced into the aromatic nucleus include the iodo and hydroxy groups. The resulting products are useful in industry and in organic chemical research. As examples, phenol is widely used as a disinfectant, and p-iodo-anisole is useful as an intermediate in the preparation of drugs having hypochloesteremic properties.

Thallic trifluoroacetate is also useful in preparing thiophenol, an industrial chemical known to be useful as a polymerization activator, antioxidant, catalyst, flotation agent, and solvent in textile manufacturing. A solution of thallic trifluoroacetate in a solvent (trifluoroacetic acid is preferred) is allowed to stand overnight at room temperature with an equimolar amount of benzene. After workup, phenyl thallium ditrifluoroacetate is obtained. Treatment of this compound with sodium N,N-dimethyl-dithiocarbamate gives phenyl thallium di(N,N-dimethyldi-thiocarbamate), which on irradiation with ultraviolet light gives diphenyl disulfide. This latter compound is readily reduced to thiophenol quantitatively as described in U.S. Pat. 2,402,186.

The following examples are intended to illustrate the compound and processes of the invention, but are not to be construed as limiting the scope thereof. Variants which are obvious to those skilled in the art of synthetic organic chemistry are considered equivalent to the invention as described and claimed. Such variants include thallic halo lower alkanoates such as thallic trichloroacetate, thallic dibromoacetate, thallic trichloropropionate, thallic fluoroacetate, and thallic difluoroacetate. Such variants are prepared in a manner analogous to that for thallic trifluoroacetate, by heating thallic oxide and the appropriate haloalkanoic acid. They are used in the same manner as thallic trifluoroacetate.

EXAMPLE 1

Thallic trifluoroacetate

A well-stirred suspension of 20 g. of thallic oxide in 100 ml. of trifluoroacetic acid was heated under reflux for 7 hours. After cooling, the suspension was filtered through a sintered disc and the solvent removed from the filtrate under reduced pressure at 40°. The residue was dried in vacuo over $P_2O_5$ to give thallic trifluoroacetate as an amorphous white solid (17.6 g.), M.P. 190–194° (dec.). The compound has an infrared spectrum (KBr) showing absorption at 1670 (s., sharp), 1430 (m., sharp), 1050–1270 (s., broad), 835 (s., sharp), 805 (s., sharp), and 722 cm.$^{-1}$ (s., sharp).

A convenient thallation mixture consists of a solution of the unisolated thallic trifluoroacetate in trifluoroacetic acid, prepared as follows:

Thallic oxide (50 g.) is stirred and refluxed in 200 ml. of trifluoroacetic acid for 26 hours. The hot reaction mixture is filtered through Celite, and the filtrate diluted to 250 ml. with trifluoroacetic acid. The amount of salt present is assayed by reacting excess (5 ml.) benzene with 20 ml. of the thallation mixture, treating the resulting mixture with KI solution as described in Example 2, and isolating the iodobenzene formed. This gives a minimum value for the amount of thallic trifluoroacetate present (moles iodobenzene=moles of salt in 20 ml. of solution). The solution is also prepared by dissolving thallic trifluoroacetate in trifluoroacetic acid.

The melting point of thallic trifluoroacetate, like that of many other compounds, is not sharp and is dependent upon the conditions under which it is determined. When the melting point tube is introduced into the melting point apparatus at room temperature, and the temperature gradually raised, the compound becomes soft at approximately 100–110°, but the color remains almost white until 180–182°, at which point it turns brown and shrinks. At 190–191°, it has shrunk appreciably, and at 195–197°, by which point it is almost completely black, it melts.

When the sample is introduced into a preheated bath at 185°, the compound melts immediately leaving a black liquid.

When the sample is introduced into a bath preheated to 175°, the compound turns slightly brown, shrinks a little, but then does not melt until approximately 190°.

The compound has always been melted completely below 200°.

It is also identifiable by the yellow color formed when a solution of it in trifluoroacetic acid is combined with benzene.

EXAMPLE 2

Iodomesitylene

Mesitylene (0.86 g.; 0.0072 mole) is added to 20 ml. of a solution of thallic trifluoroacetate in trifluoroacetic acid (as obtained by the procedure of Example 1), and the reaction mixture allowed to stand at room temperature for 1 hour. A solution of 8.3 g. of KI in 25 ml. of water is then added, the mixture stirred at room temperature for 15 minutes, ca. 1 g. of $Na_2S_2O_5$ added, the mixture stirred for a few minutes until the color changes from blue-black to yellow. The mixture is cooled, made basic with aqueous NaOH solution, and extracted with ether. The ethereal extracts are dried and the solvent removed under reduced pressure to give 1.66 g. (94%) pure iodomesitylene as a colorless solid, M.P. 29–30°.

EXAMPLE 3

The procedure of Example 2 is applied to the following substrates using the thallation conditions stated below to give the stated products.

| Substrate | Time (hrs.) | Temp. (° C.) | Yield and product(s) |
|---|---|---|---|
| Benzene | 16 | 22 | 96% iodobenzene. |
| Fluorobenzene | 16 | 22 | 70% fluoroiodobenzene (89% p; 11% o) |
| Chlorobenzene | 0.5 | 70 | 80% chloroiodobenzene (77% p; 23% o) |
| Toluene | 1 | 22 | 69% iodotoluene (91% p; 9% o). |
| Ethylbenzene | 0.8 | 22 | 86% ethyliodobenzene (95% p; 5% o). |
| m-Xylene | 0.8 | 22 | 100% 4-iodo-m-xylene. |
| Anisole | 0.25 | 22 | 75% iodoanisole (83% p; 17% o). |
| Benzoic acid | 21 | 70 | 76% iodobenzoic acid (95% o; 5% m). |
| α,α,α-Trifluorotoluene | 98 | 70 | 54% iodo-α,α,α-trifluorotoluene (81% m; 16% p; 3% o). |
| 2-bromothiophene | 0.33 | 22 | 81% 2-bromo-5-iodothiophene. |

EXAMPLE 4

Thiophenol

Phenyl thallium ditrifluoroacetate: A solution of 19.5 ml. (0.22 mole) of benzene in 250 ml. of trifluoroacetic acid containing 119.1 g. (0.219 mole) of thallic trifluoroacetate was allowed to stand at room temperature overnight with stirring. Excess trifluoroacetic acid was removed by evaporation under reduced pressure, the residue dissolved in a small amount of diethyl ether, and 25 ml. of 1,2-dichloroethane added. The mixture was then evaporated to dryness under reduced pressure, and the process repeated twice to ensure removal of excess trifluoroacetic acid. The residual colorless solid was recrystallized from 1,2-dichloroethane to give 81.8 g. (74%) of phenyl thallium ditrifluoroacetate, M.P. 203–204° dec. (after drying in vacuo for 24 hours at 67°).

Thiophenol: Treatment of 3.0 g. of phenyl thallium ditrifluoroacetate in 50 ml. of water with 2.8 g. (30% excess) of sodium N,N-dimethyldithiocarbamate dihydrate resulted in the immediate separation of 3.0 g. (97%) of yellow crystals of phenylthallium di(N,N-dimethyldithiocarbamate). Recrystallization from chloroform-methanol gave stout yellow prisms, M.P. 176–184°. A solution of 4.5 g. of phenyl thallium di(N,N-dimethyldithiocarbamate) in 450 ml. of acetone was irradiated (Rayonet Reactor, 253 mµ lamps) for 4 hours. The temperature of the reaction mixture throughout the irradiation period remained between 45–50°. The mixture was then filtered to remove 1.9 g. of a gray precipitate (thallous N,N - dimethyldithiocarbamate), and the filtrate was concentrated under reduced pressure to a brown oil. This oil was dissolved in a small amount of chloroform, filtered from an additional 0.7 g. of thallous N,N-dimethyldithiocarbamate, and the filtrate evaporated once again, and then chromatographed on a silica gel column, using chloroform-hexane (3:7) as eluant. Evaporation of the eluate gave 600 mg. (64%) of diphenyl disulfide as an oil which solidified on standing; M.P. 58.5–59.5°; its identity was confirmed by comparison with an authentic sample of diphenyl disulfide. The quantitative reduction of this material to benzenethiol is accomplished as described by Signagio, U.S. Pat. 2,402,186.

We claim:
1. Thallic trifluoroacetate.

References Cited

UNITED STATES PATENTS 2,874,176　2/1959　Mills et al. _____ 260—429.1
3,385,830　5/1968　Vomorde et al. _____ 260—75

OTHER REFERENCES

Swarts Chem. Abstracts, 33 (1939) columns 8172–3.

TOBIAS E. LEVOW, Primary Examiner

A. P. DEMERS, Assistant Examiner

U.S. Cl. X.R.

260—515, 609, 611, 650

PO-1050
(5/69)

UNITED STATES PATENT OFFICE
CERTIFICATE OF CORRECTION

Patent No. 3,594,395                Dated July 20, 1971

Inventor(s) Edward C. Taylor and Alexander McKillop

It is certified that error appears in the above-identified patent and that said Letters Patent are hereby corrected as shown below:

Column 1, lines 4-5, change "assignors" to

--- said McKillop assignor --- .

Signed and sealed this 7th day of December 1971.

(SEAL)
Attest:

EDWARD M. FLETCHER, JR.      ROBERT GOTTSCHALK
Attesting Officer               Acting Commissioner of Patents